Aug. 28, 1951 L. SCHOBERT 2,566,071
VALVE
Filed Nov. 23, 1948
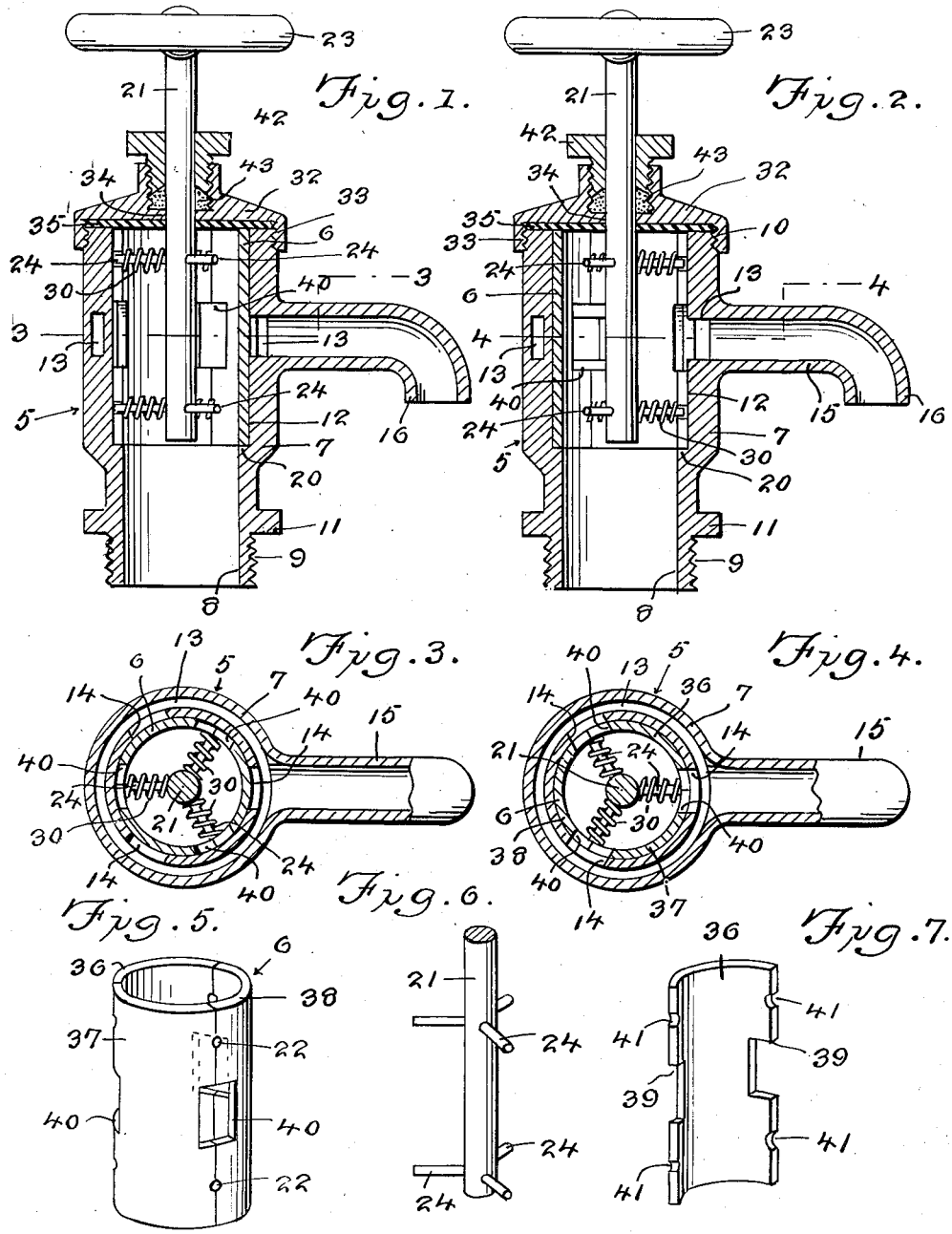
INVENTOR.
Layton Schobert
BY Victor J. Evans & Co.
ATTORNEYS Patented Aug. 28, 1951

2,566,071

UNITED STATES PATENT OFFICE 2,566,071

VALVE

Layton Schobert, Fort Worth, Tex.

Application November 23, 1948, Serial No. 61,577

2 Claims. (Cl. 251—96)

The present invention relates to a valve, and more particularly to a faucet-type valve.

The primary object of the invention is to provide a valve in which the liquid pressure exerts a force on the valve parts to seat the same when the valve is closed.

Another object is to provide a valve of the rotary cylinder type for use as a faucet in bath tubs, sinks and the like, which can be conveniently and accurately controlled and which requires very little attention since valve washers and similar elements are eliminated.

Another object of the invention is to provide a valve which is extremely simple and inexpensive to manufacture.

Other objects and advantages of the invention will become apparent during the course of the following description of the accompanying drawing, wherein:

Figure 1 is a vertical sectional view of the valve embodying the invention, showing the same in a closed position;

Figure 2 is a similar view but showing the valve in an open position;

Figure 3 is a horizontal cross-sectional view taken on line 3—3 of Figure 1 looking in the direction of the arrows;

Figure 4 is a horizontal cross-sectional view taken on line 4—4 of Figure 2;

Figure 5 is a perspective view of the valve cylinder showing the circumferentially-spaced openings therein;

Figure 6 is a fragmentary perspective view of the lower end of the cylinder-operating or valve-control shaft showing the radially-arranged arms thereon to provide coil spring seating surfaces;

Figure 7 is a perspective view of one of the arcuate sections of the valve, showing the general shape thereof.

In the drawing, and more in detail, there is shown a valve casing or housing generally designated 5 and a valve cylinder generally designated 6. The valve cylinder 6 is rotatably mounted within the valve casing and arranged to control fluid flow therethrough.

The valve body comprises a body portion 7 open at both ends and of cylindrical shape and is formed with a central longitudinal opening 8 therein. The cylindrical valve body 7 is externally threaded at both ends as at 9 and 10, and an annular boss 11 is formed integral with the body to provide a limiting stop when the threaded end 9 of the same is screwed into an outlet fitting. The annular boss is also provided with wrench-engaging faces to enable the body to be applied to such fittings or pipe ends.

The upper portion of the valve body bore 8 is slightly enlarged in diameter as at 12 to form a valve chamber, and formed in the valve body is an annular outlet flow chamber 13 in communication with the interior of the valve body bore 8 by a series of circumferentially-spaced openings 14, Figures 3 and 4, arranged 120° apart.

Formed integral with the valve body 7 is an outlet spout 15 having a downwardly-directed nozzle 16, and said spout is in liquid flow communication with the annular outlet chamber 13 as clearly shown in Figures 3 and 4.

Rotatably mounted within the enlarged portion 12 of the valve body bore 8 is the valve cylinder 6 which comprises a shell-shaped body, open at each end. The valve cylinder is machined on its outer peripheral surface to frictionally and rotatably engage the inner periphery of the enlarged portion 12 of the valve body bore 8, and has its lower end seated on the shoulder 20 formed by the said enlarged bore 12 to limit downward movement of said cylinder. The valve cylinder 6 may be made of two, three or more parts. As shown in Figure 5, the valve cylinder 6 is formed of three arcuate sections or parts 36, 37 and 38 made of rigid metal or any other suitable material. Each of the sections is provided with a pair of cut-outs 39, Figure 7, at its side or meeting edges and when the sections 36, 37 and 38 are assembled to form the valve cylinder 6, the cut-outs 39 coact to define three equally-spaced openings 40 which are adapted to move into and out of registry with the spaced openings 14 in the valve body upon rotation of the valve cylinder 6.

For turning the valve cylinder 6, there is provided an upwardly-extending operating shaft 21 which projects into the interior of the cylinder 6 centrally thereof. An operating handle 23 is affixed to the upper end of the operating shaft 21, and formed integral with or secured to the lower end of the shaft 21 is a series of equally-spaced, radially-extending, cylindrical arms or pins 24. The outer ends of the arms 24 are received or seated in holes 22, Figure 5, which are formed by the adjacent cut-outs 41, Figure 7, in the meeting edges of the arcuate sections 36, 37 and 38 when the latter are assembled to form the valve cylinder 6.

A series of coil springs 30 are arranged within the valve cylinder 6 so that each coil spring will encircle the radial projecting pin 24. Thus, the coil springs will yieldingly urge the arcuate valve cylinder sections 36, 37 and 38 into frictional contactual engagement with the inner peripheral surface of the valve body bore 12.

Mounted on the upper end of the valve body 5 is a bonnet 32 having an annular flange 33 internally threaded for being received on the correspondingly threaded portion 10 of the valve body. A central opening 34 in the valve bonnet 32 accommodates the control shaft 21, and a packing disk 35 having a central opening likewise for accommodating the control shaft is interposed between the valve body 5 and bonnet 32, respectively. The packing disk 35 also engages the top of the valve cylinder and prevents escape of liquid flow between the valve cylinder, valve body and bonnet structure. A cap nut 42 is threaded into the upper portion of the bonnet 32, and the operating shaft 21 rotatably fits through the nut and packing 43 arranged therebelow.

In operation, the valve cylinder is turned by rotation of the control shaft 21 in either direction of rotary movement about the axis of the cylinder 6 so that when the valve is in a closed position, Figure 1, the openings 40 in the valve cylinder 6 will be out of registry with the ports 14 and arrest fluid flow through the valve. If the control shaft 21 is rotated an angular distance of 60° in either direction from that shown in Figure 1, the openings 40 will be brought into registry with the ports 14 and permit liquid flow through the valve and faucet spout 15.

By reason of the fact that the valve cylinder 6 is arranged on the interior of the valve body enlarged bore 12, the water pressure will exert a force in addition to the yielding action of the coil springs 30 to seat the valve cylinder when the valve is closed, and thereby form a tight liquid seal without necessitating the use of flexible washers or other sealing valve elements which quickly disintegrate under various temperature conditions and require frequent replacement over relatively short time periods.

It is to be understood that the form of the invention shown is to be taken as a preferred embodiment of the invention and that various changes in the shape, size and arrangement of parts can be resorted to without departing from the spirit of the invention or the scope of the subjoined claims.

I claim:

1. In a valve structure, a valve body having a central enlarged bore and a series of circumferentially spaced outlet openings communicating with an annular outlet chamber, a valve cylinder rotatably mounted in said enlarged bore, said cylinder including a plurality of arcuate sections having cutouts in their side edges, said cutouts coacting to define a plurality of equally spaced openings equal in number to the outlet openings in said valve body such that the openings in said valve cylinder can be moved into and out of registry with each of the outlet openings in the valve body, there being a plurality of spaced holes arranged in said cylinder, and manually operable means operatively connected to said valve cylinder for rotating the latter, said last-named means comprising an operating shaft projecting into the interior of the cylinder centrally thereof, a plurality of radially extending cylindrical arms each having its inner end secured to said shaft and its outer end seated in the holes in said cylinder, and a coil spring circumposed on each of said arms for yieldingly urging said arcuate valve cylinder sections into frictional engagement with the inner wall of the bore in said valve body.

2. In a valve structure, a valve body having a central bore and a series of spaced outlet openings communicating with an outlet chamber, a valve cylinder rotatably mounted in said bore, said cylinder including a plurality of arcuate sections having cutouts in their side edges, said cutouts coacting to define a plurality of equally spaced openings equal in number to the outlet openings in said valve body such that the openings in said valve cylinder can be moved into and out of registry with each of the outlet openings in the valve body, there being a plurality of holes arranged in said cylinder, and manually operable means operatively connected to said valve cylinder for rotating the latter, said last-named means comprising an operating shaft projecting into the interior of the cylinder, a plurality of cylindrical arms each having its inner end secured to said shaft and its outer end seated in the holes of said cylinder, and a coid spring circumposed on each of said arms for yieldingly urging said arcuate valve cylinder sections into frictional engagement with the inner wall of the bore in said valve body.

LAYTON SCHOBERT.

REFERENCES CITED

The following references are of record in the file of this patent:

UNITED STATES PATENTS

| Number | Name | Date |
|---|---|---|
| 414,136 | Blanchard | Oct. 29, 1889 |
| 2,075,460 | Parker | Mar. 30, 1937 |
| 2,105,331 | Rasmussen | Jan. 11, 1938 |
| 2,388,268 | Kromhout | Nov. 6, 1945 |

FOREIGN PATENTS

| Number | Country | Date |
|---|---|---|
| 3,774 | Great Britain | 1908 |
| 555,368 | Great Britain | Aug. 19, 1943 |